May 10, 1938.  R. L. DASHNER  2,116,750
DOME LIGHT
Original Filed July 29, 1935    3 Sheets-Sheet 2
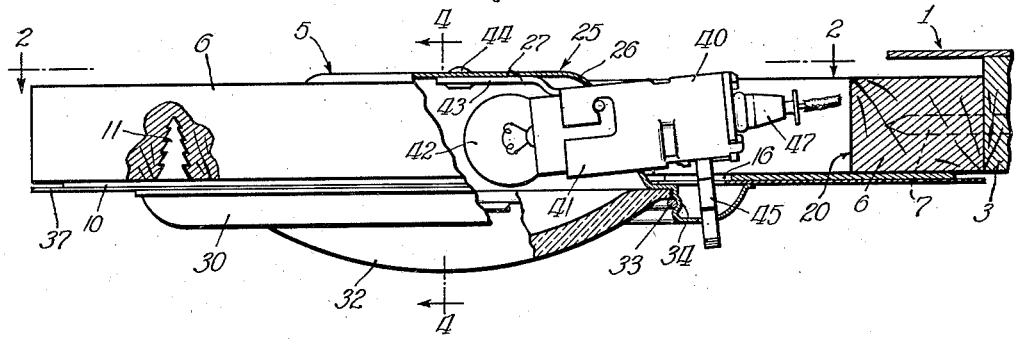
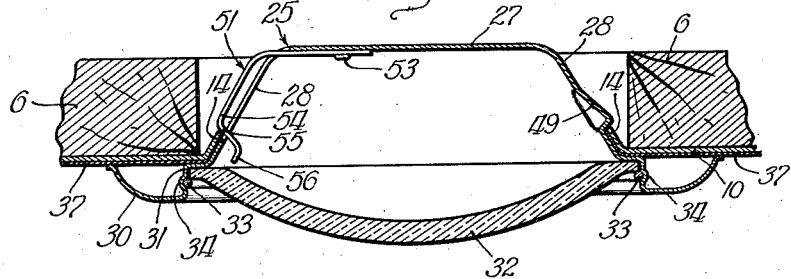
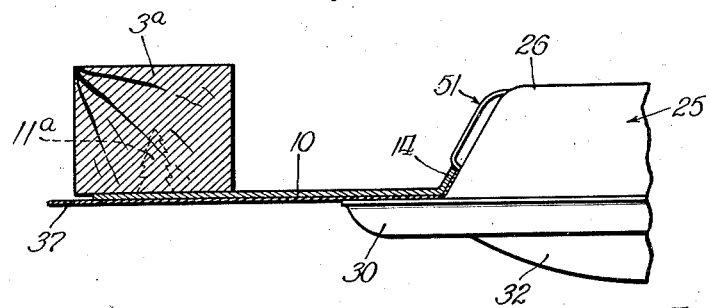
Inventor:
Ralph L. Dashner
By:
Attys.

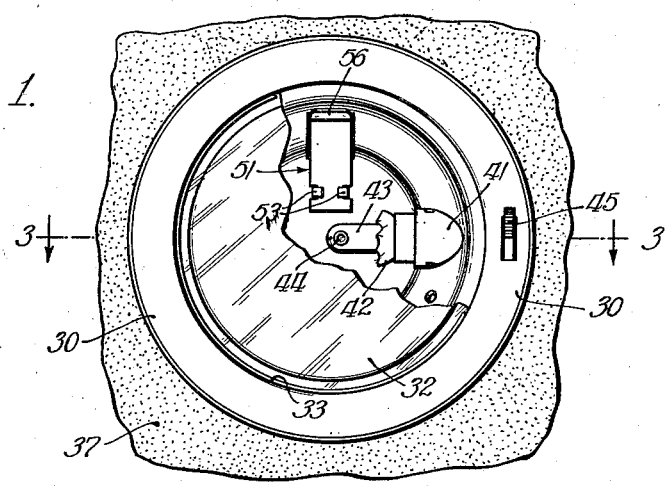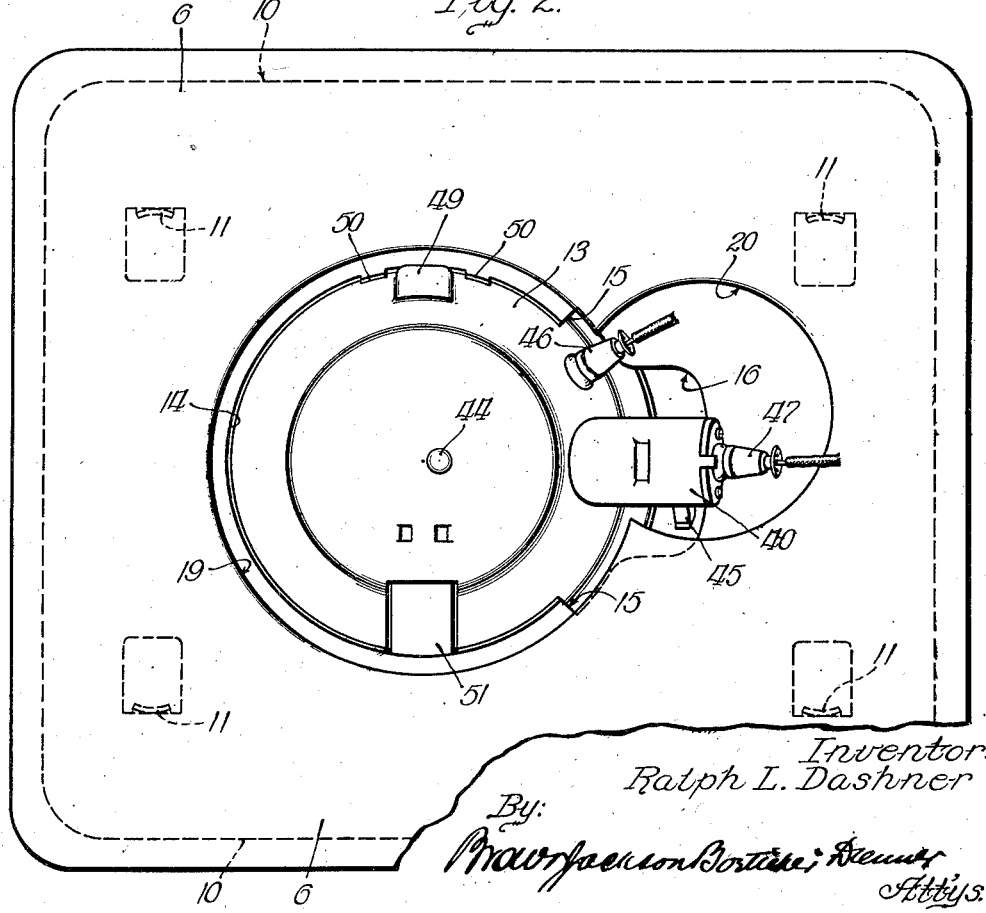

May 10, 1938.   R. L. DASHNER   2,116,750
DOME LIGHT
Original Filed July 29, 1935   3 Sheets-Sheet 3
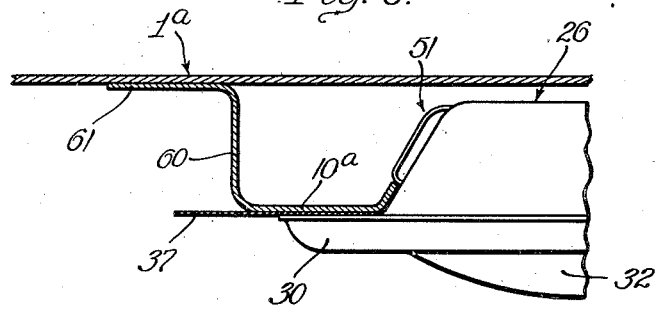
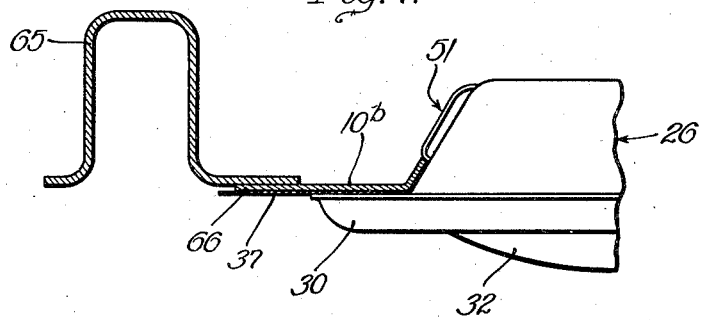
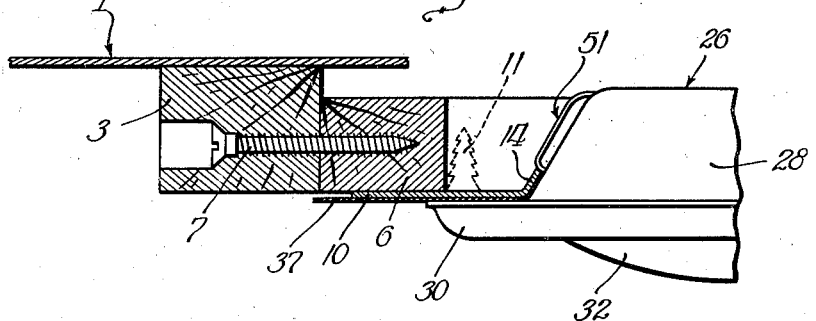
Inventor:
Ralph L. Dashner
By:
Attys.

Patented May 10, 1938

2,116,750

UNITED STATES PATENT OFFICE 2,116,750

DOME LIGHT

Ralph L. Dashner, Logansport, Ind., assignor to R-B-M Manufacturing Company, Logansport, Ind., a corporation of Indiana Application July 29, 1935, Serial No. 33,713
Renewed May 15, 1937

8 Claims. (Cl. 240—7.35)

The present invention relates generally to lighting systems for automotive vehicles and the like and is particularly concerned with the provision of a new and improved dome lamp assembly adapted to be mounted on the interior of the roof of closed cars. While the dome lamp assembly of the present invention has been particularly designed for automotive vehicles, it is to be understood that its use in other types of vehicles and in other installations is contemplated.

The principal object of the present invention is the provision of a new and improved dome lamp assembly characterized by the convenient and inexpensive manner in which the same can be installed. Specifically, it is an object of the present invention to provide a construction in which the lamp housing, lens and switch means can be positioned in the mounting plate on the vehicle by the simple operation of merely pushing the lamp housing into position, preferably but not necessarily after the proper electrical connections have been made. Heretofore, it has been necessary to separately fasten the lamp housing in position, which required first removing the lens, but according to the principles of the present invention it is necessary merely to snap the assembled lamp housing, lens and switch in place.

Another object of the present invention is the provision of a dome lamp assembly in which the lamp housing, or the mounting plate in which the lamp housing is to be fastened, carries spring or catch means which engages the associated member as soon as it is brought to the proper position with respect to the other, thereby eliminating any necessity for performing such additional operations as first removing the lens, then securing the housing or lamp body in position, and lastly, replacing the lens in the housing. Still further, another object of the present invention is the provision of such fastening means that the lamp housing and associated parts may be conveniently removed at any time.

These and other objects and advantages of the present invention will be apparent to those skilled in the art after a consideration of the following detailed description of the preferred embodiments, taken in conjunction with the accompanying drawings illustrating the same.

In the drawings:

Figure 1 is a plan view of a dome lamp structure constructed according to the present invention, the view being taken as looking upwardly toward the dome lamp when it is in position in the car or other object on which it is installed;

Figure 2 is a back view of the construction shown in Figure 1, the view being taken along the line 2—2 of Figure 3;

Figure 3 is a section taken along the line 3—3 of Figure 1, certain parts being shown in elevation;

Figure 4 is a section taken along the line 4—4 of Figure 3;

Figures 5, 6, and 7 illustrate modified forms of dome lamp mountings; and

Figure 8 illustrates the manner of mounting the dome lamp shown in Figures 1 to 4.

Referring now more particularly to Figures 1 to 4, inclusive, and 8, the reference numeral 1 (Figure 3) indicates the body of an automobile of the closed type, the portion illustrated being the top which in many forms of construction includes wood bows or ribs 3 (Figure 8). The entire dome lamp unit is indicated by the reference numeral 5 and includes a wood mounting block 6 which is secured to the bows 3 by screws 7 or any other suitable means. A metal mounting plate 10 is adapted to be secured to the wood block by any suitable means, such as anchoring ears 11 having serrated edges, as best shown in Figure 3, and preferably formed integral with and projecting at right angles to the general plane of the mounting plate 10.

The mounting plate is provided with a central opening 13 which is generally circular and which is formed with an inwardly bent marginal flange 14 which is interrupted, as at 15, adjacent which interruption the mounting plate 10 is provided with a second opening 16. The wood mounting block 6 is formed with openings 19 and 20 which correspond generally with and register with the openings 13 and 16 formed in the mounting plate 10, the laterally disposed openings 16 and 20 being provided for the purpose of accommodating dome lamp switch mechanism which will be referred to later.

The lamp housing assembly, indicated in its entirety by the reference numeral 25, comprises a housing or backing member 26 in the form of a hollow body member having a back wall 27 and flaring side wall portions 28, the latter terminating in a decorative flange 30 adapted to overlie the central portion of the mounting plate 10 and formed with a recessed shoulder portion 31 which receives a translucent lens 32. The thickness of the housing is approximately the same as the bows or ribs of the vehicle top or roof, as shown in Figures 3 and 5. The lens is conventional and is preferably held in place in the lamp housing, so as to form a part of the lamp housing assembly, by means of a spring ring 33 which is adapted to be seated in a groove 34 formed in the shouldered marginal portion 31 of the lamp housing. It is to be noted that the inwardly directed flanged portion 14 of the mounting plate corresponds as to angle of inclination with the flaring side wall portions 28 of the lamp housing so as to snugly receive the latter with its marginal flange 30 seated against the cloth headlining 37 or other finishing material which, in turn, is disposed directly against the metal mounting plate 10 in most constructions.

The switch assembly is indicated in Figures 2 and 3 by the reference numeral 40 and includes a bayonet type lamp socket 41 in which a lamp bulb 42 is adapted to be mounted, the housing of the socket member 41 having an extended section 43 riveted, as at 44, to the lamp housing. The switch assembly includes conventional switch mechanism represented in Figures 2 and 3 by the switch lever 45. A ground connection is indicated in Figure 2 by the reference numeral 46 and the connection with the switch means 42 is indicated in Figure 3 at 47, these connections being included in the electrical system of the automobile at the time of assembly according to the conventional practice. In the construction shown in the figures just described, where the metal mounting plate 10 is fastened to a wood mounting block, the ground connection 46 for the lamp housing assembly or unit 25 is necessary. However, as will be described later, in some cases a ground connection 46 as a separate part need not be provided.

Heretofore, dome lights have been held in the roof of cars by mounting the lamp housing assembly 25 or a part equivalent thereto in the roof of the car by means such as screws or the like driven into a wood mounting block. In installing the dome lamp it was necessary to first remove the lens from the housing in order to provide for inserting the screws and mounting the lamping housing. It was therefore impracticable to send to the assembly line completely assembled lamp housing units, or if such units were supplied to the assembly line, it was necessary to first remove the lens before mounting the dome lamp. The practice in this respect is materially simplified and made less expensive, according to the principles of the present invention, by providing latch means to secure the lamp housing to its mounting plate by means which becomes operative by the mere act of inserting the housing in position.

Referring now more particularly to Figures 2 and 4, in one side wall portion 28 of the lamp housing backing member 26 a projection or raised portion 49 is provided which is so disposed with reference to the edges of the lamp housing 26 that the projection 49 is adapted to engage over the inner edge of the marginal flange 14 of the mounting plate between two locating lugs 50 at one side of the opening. At the other side I provide a spring catch member 51 in the form of a tongue secured, as by ears 53, to the back wall 27 of the lamp housing backing member 26 and having a portion 54 which extends generally outwardly of the housing side wall portion 28 in line with the projection 49 at the opposite side of the lamp housing. This portion of the spring 51 is provided with an angled section 55 adapted to engage over the marginal flange 14 at a point opposite the part engaged by the projection or extended portion 49. Thus, in installing the lamp housing assembly 25, the portion 49 would first be inserted in the mounting plate and then the other side of the housing would be pushed into place, allowing the spring 51 on that side to snap into position in the portion provided for it on the mounting plate 10. If desired, however, the parts may be designed to be engaged by a simple push.

The outer end of the spring member 51 terminates in a finger piece 56 which is disposed within the lamp housing backing member 26 so as to be accessible when the lens 32 is removed. Thus, while the lamp housing assembly or unit 25 may be mounted in position in the mounting plate 10 by the mere act of pushing the housing up flush with the inner wall of the car body, there is no danger that the lamp housing assembly will become disengaged. When it is desired for any reason to remove the lamp housing assembly, all that it is necessary to do is to remove the lens so as to make the finger piece 56 accessible and then spring the same inwardly until the portion 54 clears the adjacent marginal portion 14 of the mounting plate. Preferably, the angle of the edge engaging portion 54 and the projection 49, is such that in many instances the lamp housing may be removed by prying the housing from the mounting plate. The finger piece end 56 is thus not necessary in all cases.

It is not necessary in all cases to supply a wood mounting block, such as the one indicated by the reference numeral 6 described above, for as indicated in Figure 5 the mounting plate 10, instead of being fastened to a wood mounting block, may be secured directly to the wood bow 3a by any suitable means, such as the serrated anchoring ears 11a referred to above.

Figures 6 and 7 illustrate dome lamp mountings particularly arranged for cars employing an all steel body construction. In Figure 6 the mounting plate 10a is substantially of the same construction as described above but is provided with a flanged periphery 60 dimensioned so as to dispose the central portion of the mounting plate the required distance from the roof of the car, indicated at 1a, the edge 61 of the mounting plate 10a being adapted to lie flat against the roof panel 1a and to be welded or otherwise secured thereto. Where steel bows, as indicated at 65 in Figure 7, are employed, the mounting plate, indicated at 10b, may be flat so as to facilitate being welded or otherwise secured, as at 66, to the steel bow 65.

When the mounting plate is fastened directly to the steel top or steel bows or ribs, as illustrated in Figures 6 and 7, the lamp housing assembly 25 and the associated switch mechanism will be grounded as soon as the members 49 and 51 engage the mounting plate to hold the lamp housing in position. Thus, the necessity for a ground terminal and a ground wire is eliminated. In this connection it will be noted from Figure 4 that by virtue of the inclined side wall portions 28 and the inclination of the marginal flange 14 of the mounting plate and the angle of the spring end 55, a firm contact is established between the lamp housing and its mounting plate which not only prevents rattling and effectively secures the lamp housing in position, in connection with the parts 49 and 51, but, in addition, the grounding of the lamp housing is materially facilitated thereby.

In all of the constructions described, the mounting plates, including any associated wood mounting blocks, are fastened to the car body at some point along the assembly line prior to the point where the lamp housing assemblies are installed. The lamp housing assemblies, each with the necessary lens, bulb, socket and switch mechanism, are preferably brought to the assembly line in completely assembled units, and as the car body with the mounting plates secured thereto moves along the assembly line, it is a simple matter to quickly and conveniently make the necessary one or two electrical connections and then mount the lamp housing assembly in position by merely pushing the same into place in the mounting plate, it not being necessary to remove the lens and drive home a plurality of mounting screws or the like in order to fix the lamp housing in position.

While I have shown and described above the preferred form of my invention, it will be apparent to those skilled in the art that the present invention is not to be limited to the particular details shown and described above, but that, in fact, different means may be employed in the practice of the broader aspects of my invention.

What I claim, therefore, and desire to secure by Letters Patent is:

1. A dome lamp for vehicles and the like comprising a lamp housing including a detachable lens, and cooperating means serving as a spring catch for holding the lamp housing in position on the vehicle when the lamp housing is moved into position thereon with the lens attached to the lamp housing, said housing and said means being formed to render the catch means accessible when the lens is removed from the lamp housing for releasing the latter from the vehicle.

2. A dome lamp unit comprising a mounting plate adapted to be secured to the vehicle and including a central apertured section having an inwardly directed flange, a lamp housing assembly adapted to be disposed in said opening after the mounting plate is attached to said vehicle, said housing assembly including a projecting portion at one side adapted to engage the inner edge of said flange, and a spring catch adapted to snap behind said flange at a point opposite said projection for retaining said lamp housing assembly in position on said mounting plate.

3. A dome lamp unit for vehicles and the like comprising a hollow lamp housing assembly having an enclosing lens, spring means removably fastening the lens in position, a mounting plate adapted to be secured to the vehicle independently of the lamp housing assembly and having a portion formed to receive said lamp housing assembly, a switch, socket and lamp bulb fixed to said housing assembly and attachable to and detachable from the mounting plate therewith, and a spring latch separate from said spring means and adapted to engage over a portion of the mounting plate when the lamp housing assembly is mounted in said housing receiving portion thereof for removably securing the lamp housing assembly, including said switch, socket and lamp bulb, to the mounting plate, said spring latch being retractable and including a finger portion disposed within the lamp housing assembly and accessible for releasing the latch after the lens is removed from the housing assembly.

4. In a dome lamp assembly for the roof of a vehicle, a mounting plate having an opening formed therein and adapted to be disposed between two adjacent ribs of the vehicle roof, a lamp housing comprising a central hollow section adapted to fit in the opening in said mounting plate and of approximately the same thickness as said ribs, there being an opening formed in said hollow section, and spring means carried by said lamp housing inwardly of the marginal section thereof and having a portion extending through said opening and adapted to engage said mounting plate to hold the lamp housing and mounting plate in assembled relation when the lamp housing is disposed in position in the mounting plate.

5. As an article of manufacture, a lamp housing comprising a hollow body member having a back wall and side wall portions provided with lens receiving means, and an attaching spring catch anchored to the body member and extending to a point outside said side walls, said spring member having a finger piece disposed on the interior of said lamp housing and terminating at a point between said lens receiving means and said back wall.

6. As an article of manufacture, a lamp housing comprising a relatively shallow body member having a back wall and side wall portions, the side wall portion at one side of said housing including an integral outwardly extended projection and the side wall portion of said housing at the other side opposite said projection having a relatively large opening therein, and a spring member anchored to the inside of the back wall of the lamp housing and including a rounded section projecting outwardly of the opening in the side wall portion opposite said integral projection.

7. In a dome lamp unit for the roof of a vehicle or the like receiving head lining material and including an apertured mounting plate attached to the vehicle roof underneath said head-lining material, the combination of a lamp housing comprising a relatively shallow body member having a flange with lens receiving means carried between said flange and said body member, detachable means for holding the lens in said lens receiving means, and means carried by the lamp housing and engageable with the edge of the aperture in said mounting plate for holding said lamp housing in place with the flange thereof overlying the headlining material surrounding said aperture.

8. An electrical unit adapted for mounting in a panel having an opening to receive the unit, comprising a flanged case adapted to be inserted in said opening with the flange overlying the panel, and a pair of members carried by said case, at least one being a spring member fastened to the back of the case and both members having portions extending substantially to the flange on the case and formed to engage opposite edges of the panel opening at such an angle that the resiliency of the spring member exerts a continual bias actively holding the case in the panel opening with the flange on the case up against the panel.

RALPH L. DASHNER.